(12) United States Patent
Eichenauer et al.

(10) Patent No.: US 7,790,805 B2
(45) Date of Patent: Sep. 7, 2010

(54) IMPACT-MODIFIED BLENDS

(75) Inventors: Herbert Eichenauer, Dormagen (DE); Bernd Urbanneck, Mönchengladbach (DE); Thomas Eckel, Dormagen (DE); Eckhard Wenz, Köln (DE)

(73) Assignee: Bayer MaterialScience AG, Leverkusen (DE)

(*) Notice: Subject to any disclaimer, the term of this patent is extended or adjusted under 35 U.S.C. 154(b) by 22 days.

(21) Appl. No.: 10/721,127

(22) Filed: Nov. 25, 2003

(65) Prior Publication Data

US 2004/0132905 A1 Jul. 8, 2004

(30) Foreign Application Priority Data

Nov. 29, 2002 (DE) ................. 102 55 824

(51) Int. Cl.
  *C08F 279/02* (2006.01)
  *C08F 279/04* (2006.01)
  *C08L 51/04* (2006.01)
  *C08L 67/00* (2006.01)
  *C08L 69/00* (2006.01)

(52) U.S. Cl. ............... 525/64; 525/66; 525/67; 525/68

(58) Field of Classification Search .......... 525/64, 525/66, 67, 68
See application file for complete search history.

(56) References Cited

U.S. PATENT DOCUMENTS

| | | | |
|---|---|---|---|
| 3,954,905 A | 5/1976 | Margotte et al. | 260/873 |
| 3,988,389 A | 10/1976 | Margotte et al. | 260/873 |
| 4,747,959 A | 5/1988 | Ho et al. | 210/768 |
| 5,242,596 A | 9/1993 | Bachem et al. | 210/644 |
| 5,276,092 A * | 1/1994 | Kempner et al. | 525/84 |
| 5,679,759 A | 10/1997 | Wittmann et al. | 528/196 |
| 6,716,916 B1 * | 4/2004 | Sun et al. | 525/66 |
| 6,822,045 B2 * | 11/2004 | Miyatake et al. | 525/64 |
| 2002/0115761 A1 | 8/2002 | Eckel et al. | |
| 2003/0092819 A1 | 5/2003 | Miyatake et al. | 524/457 |
| 2004/0132905 A1* | 7/2004 | Eichenauer et al. | 525/63 |

FOREIGN PATENT DOCUMENTS

| | | |
|---|---|---|
| CA | 1 146 295 | 5/1983 |
| CA | 1146295 | 5/1983 |
| DE | 1 170 141 | 5/1964 |
| DE | 1 810 993 | 6/1970 |
| WO | 00/06648 | 2/2000 |
| WO | WO 01/16230 A1 * | 3/2001 |

OTHER PUBLICATIONS

Hitachi Chemical, STN AN 1983:423499 (Jan. 1983).*

* cited by examiner

*Primary Examiner*—Jeffrey C Mullis
(74) *Attorney, Agent, or Firm*—John E. Mrozinski, Jr.; Noland J. Cheung

(57) ABSTRACT

A thermoplastic molding composition suitable for producing article having improved surface quality is disclosed. The composition includes A) at least one polymeric resin selected from the group consisting of polycarbonate, polyester carbonate, polyamide, polyalkylene terephthalate and polyoxymethylene, and B) a co-precipitated mixture of graft polymer B.1 the preparation of which entailed redox initiation and graft copolymer B.2 the preparation of which entailed persulfate initiation.

24 Claims, 1 Drawing Sheet

IMPACT-MODIFIED BLENDS

CROSS REFERENCE TO RELATED PATENT APPLICATION

The present patent application claims the right of priority under 35 U.S.C. §119 (a)-(d) of German Patent Application No. 102 55 824.8 filed Nov. 29, 2002.

FIELD OF THE INVENTION

The invention relates to a thermoplastic molding composition and more particularly to a composition containing a graft polymer.

SUMMARY OF THE INVENTION

A thermoplastic molding composition suitable for producing article having improved surface quality is disclosed. The composition includes A) at least one polymeric resin selected from the group consisting of polycarbonate, polyester carbonate, polyamide, polyalkylene terephthalate and polyoxymethylene, and B) a co-precipitated mixture of graft polymer B.1 the preparation of which entailed redox initiation and graft copolymer B.2 the preparation of which entailed persulfate initiation.

TECHNOLOGICAL BACKGROUND OF THE INVENTION

Thermoplastic molding compositions comprising polycarbonates and ABS polymers have long been known. DE-A 1 170 141, for example, describes readily processable molding compositions comprising polycarbonates and graft polymers of monomer mixtures of acrylonitrile and an aromatic vinyl hydrocarbon on polybutadiene.

In DE-A 1 810 993, the improved heat resistance of polycarbonate in admixture with ABS graft polymers or copolymers based on α-methylstyrene is emphasised.

The subject-matter of DE-A 22 59 565 and DE-A 23 29 548 is the improved joint line strength of PC/ABS molding compositions, graft polymers of a particular particle size being used in both specifications as a constituent of the ABS component. EP-A 0 704 488 discloses thermoplastic molding compositions having a particle diameter of from 0.20 to 0.35 µm.

DE-A 28 18 679 teaches that PC/ABS mixtures exhibit particularly high low-temperature strength when the ABS polymer contains two graft mixed polymers having different degrees of grafting.

It is also known to filter polymer latices in order to remove impurities or coarse fractions. For example, the filtration of rubber latices is described in Houben Weyl XIV/1, Makromolekulare Stoffe 1, pages 348 to 356 (Georg Thieme Verlag, Stuttgart, 1961) and in DE-A 4 126 483 and U.S. Pat. No. 4,747,959. Connections with the mechanical properties are not known from that prior art.

The object of the present invention is to provide impact-modified compositions having an optimized combination of properties of good surface quality (especially a very low number of faults, so-called "pinholes"), good flow behavior and good stress cracking resistance (ESC behavior). The compositions may also be rendered flame-resistant with flameproofing agents. Impact-modified compositions which have been rendered flame-resistant are suitable especially for thin-walled applications such as notebooks.

It has been found that impact-modified polycarbonate compositions containing a mixture, obtained by co-precipitation, of at least two graft polymers exhibit the desired properties.

DETAILED DESCRIPTION OF THE INVENTION

Figure 1:
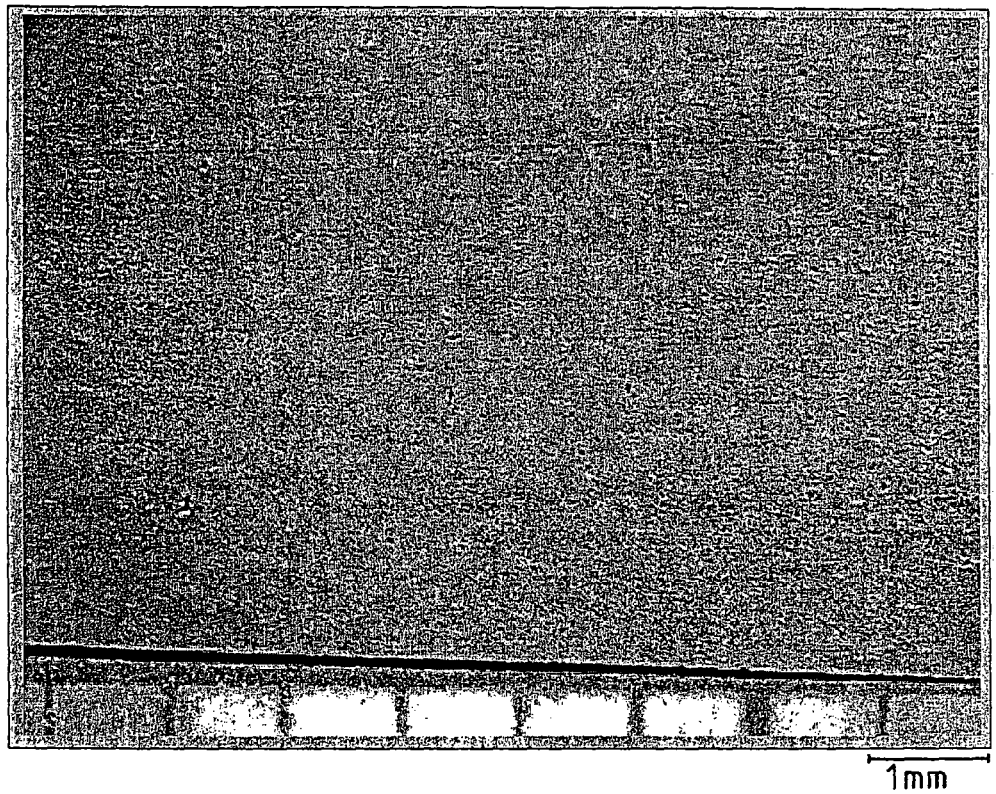
FIG. 1 shows the surface quality demonstrative of the invention.

Accordingly, the invention provides compositions containing
A) at least one thermoplastic resin selected from the group consisting of polycarbonates, polyester carbonates, polyamides, polyalkylene terephthalates and polyoxymethylene, and
B) a mixture, obtained by co-precipitation, of a plurality of graft polymers, preferably graft polymers B.1 and B.2.

Preference is given to compositions containing
A) from 10 to 99 parts by weight, preferably from 20 to 98.5 parts by weight, especially from 30 to 98 parts by weight, of at least one thermoplastic resin selected from the group consisting of polycarbonates, polyester carbonates, polyamides, polyalkylene terephthalates and polyoxymethylene,
B) from 0.5 to 90 parts by weight, preferably from 1.5 to 80 parts by weight, especially from 2 to 70 parts by weight, of a mixture, obtained by co-precipitation, of a plurality of graft polymers, preferably graft polymers B.1 and B.2,
C) from 0 to 20 parts by weight, preferably from 0 to 18 parts by weight, particularly preferably from 0 to 16 parts by weight, of flameproofing agent,
D) from 0 to 5 parts by weight of fluorinated polyolefin.

Those constituents and other components which may be used in the compositions according to the invention are illustrated by way of examples hereinbelow.

In compositions that do not contain flameproofing agent, the amount of component A) is preferably from 40 to 95 parts by weight, especially from 40 to 90 parts by weight, most particularly preferably from 50 to 85 parts by weight, and the amount of component B) is preferably from 5 to 60 parts by weight, especially from 10 to 60 parts by weight, most particularly preferably from 15 to 50 parts by weight.

Component A

Aromatic polycarbonates and aromatic polyester carbonates which are suitable according to the invention as component A are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934).

The preparation of aromatic polycarbonates is carried out, for example, by melting processes or by reacting diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents having a functionality of three or more, for example triphenols or tetraphenols.

Diphenols for the preparation of aromatic polycarbonates and/or aromatic polyester carbonates are preferably those of formula (I)

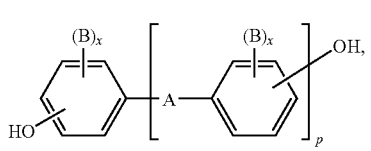

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical of formula (II) or (III)

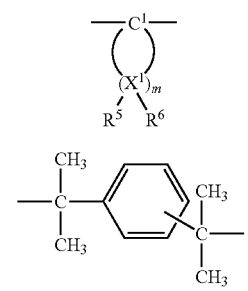

each of the substituents B represents $C_1$- to $C_{12}$-alkyl, preferably methyl, halogen, preferably chlorine and/or bromine, the substituents x are each independently of the other 0, 1 or 2, p represents 1 or 0, and $R^5$ and $R^6$ can be selected individually for each $X^1$ and are each independently of the other hydrogen or $C_1$- to $C_6$-alkyl, preferably hydrogen, methyl or ethyl, $X^1$ represents carbon, and m represents an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)-sulfones and α,α-bis-(hydroxyphenyl)-diisopropyl-benzenes and their derivatives brominated and/or chlorinated on the ring.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone and their di- and tetra-brominated or -chlorinated derivatives, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. Special preference is given to 2,2-bis-(4-hydroxyphenyl)-propane (bisphenol A).

The diphenols may be used individually or in the form of any desired mixtures. The diphenols are known in the literature or obtainable by processes known in the literature.

Suitable chain terminators for the preparation of thermoplastic aromatic polycarbonates are, for example, phenol, p-chlorophenol, p-tert.-butylphenol or 2,4,6-tribromophenol, as well as long-chained alkylphenols, such as 4-(1,3-tetramethylbutyl)-phenol according to DE-A 2 842 005, or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol. % to 10 mol. %, based on the molar sum of the diphenols used in a particular case.

The thermoplastic aromatic polycarbonates and polyester carbonates have weight-average molecular weights ($M_w$, measured by ultracentrifugation or scattered light measurement, for example) of from 10,000 to 200,000, preferably from 15,000 to 80,000.

The thermoplastic aromatic polycarbonates may be branched in a known manner, preferably by the incorporation of from 0.05 to 2.0 mol. %, based on the sum of the diphenols used, of compounds having a functionality of three or more, for example compounds having three or more phenolic groups.

Both homopolycarbonates and copolycarbonates are suitable. For the preparation of copolycarbonates according to the invention as component A, from 1 to 25 wt. %, preferably from 2.5 to 25 wt. %, based on the total amount of diphenols to be used, of polydiorganosiloxanes having hydroxyaryloxy terminal groups may also be used. Those compounds are known (U.S. Pat. No. 3,419,634) and may be prepared by processes known in the literature. The preparation of copolycarbonates containing polydiorganosiloxanes is described in DE-A 3 334 782.

In addition to the homopolycarbonates of bisphenol A, preferred polycarbonates are the copolycarbonates of bisphenol A containing up to 15 mol. %, based on the molar sum of diphenols, of diphenols other than those mentioned as being preferred or particularly preferred, especially 2,2-bis-(3,5-dibromo-4-hydroxy-phenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, other chain terminators for the preparation of aromatic polyester carbonates include chlorocarbonic acid esters of the mentioned monophenols and the acid chlorides of aromatic monocarboxylic acids, which may optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol. %, based in the case of phenolic chain terminators on moles of diphenol and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection DE-A 2 940 024 and DE-A 3 007 934).

There may be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl-methane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol. %, based on diphenols used. Phenolic branching agents may be placed in the reaction vessel with the diphenols, acid chloride branching agents may be introduced together with the acid dichlorides.

The content of carbonate structural units in the thermoplastic aromatic polyester carbonates may vary as desired. The carbonate group content is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic aromatic polycarbonates and polyester carbonates may be used alone or in any desired mixture.

Polyamides which are suitable according to the invention (as component A) are known or may be prepared according to known processes.

Polyamides which are suitable according to the invention include homopolyamides, copolyamides and mixtures of such polyamides. They may be semi-crystalline and/or amorphous polyamides. Suitable semi-crystalline polyamides are polyamide-6, polyamide-6,6, mixtures and corresponding copolymers of those components. Also suitable are semi-crystalline polyamides whose acid component is wholly or partially of terephthalic acid and/or isophthalic acid and/or suberic acid and/or sebacic acid and/or azelaic acid and/or adipic acid and/or cyclohexanedicarboxylic acid, whose diamine component is wholly or partially m- and/or p-xylylenediamine and/or hexamethylenediamine and/or 2,2,4-trimethylhexamethylenediamine and/or 2,4,4-trimethylhexamethylenediamine and/or isophoronediamine, and whose composition is known.

Mention may also be made of polyamides which are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof.

Known products can be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4, 4'-diamino-dicyclohexylmethane, 3-aminomethyl-3,5,5-trimethylcyclohexylamine, 2,5- and/or 2,6-bis-(aminomethyl)-norbornane and/or 1,4-diaminomethyl-cyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids, such as e-aminocaproic acid, w-aminoundecanoic acid or w-aminolauric acid or their lactams.

Particularly suitable amorphous polyamides are polyamides prepared from isophthalic acid, hexamethylenediamine and further diamines, such as 4,4-diaminodicyclohexylmethane, isophoronediamine, 2,2,4- and/or 2,4,4-trimethyl-hexamethylenediamine, 2,5- and/or 2,6-bis-(aminomethyl)-norbornene; or from isophthalic acid, 4,4'-diaminodicyclohexylmethane and 68-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine Instead of pure 4,4'-diaminodicyclohexylmethane, it is also possible to use mixtures of the position isomers diaminedicyclohexalmethanes which are composed of from 70 to 99 mol. % of the 4,4'-diamino isomer
from 1 to 30 mol. % of the 2,4'-diamino isomer and
from 0 to 2 mol. % of the 2,2'-diamino isomer, optionally according to more highly condensed diamines, which are obtained by hydrogenation of commercial grade diaminodiphenylmethane. The isophthalic acid may be replaced by up to 30% terephthalic acid.

The polyamides preferably have a relative viscosity (measured on a 1 wt. % solution in m-cresol at 25° C.) of from 2.0 to 5.0, particularly preferably from 2.5 to 4.0.

The polyamides may be contained in component A alone or in any desired mixture with one another.

Suitable polyalkylene terephthalates are reaction products of aromatic dicarboxylic acids or reactive derivatives thereof, such as dimethyl esters or anhydrides, and aliphatic, cycloaliphatic or araliphatic diols, and mixtures of those reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol. %, based on the diol component, of ethylene glycol and/or 1,4-butanediol radicals.

The preferred polyalkylene terephthalates may contain, in addition to terephthalic acid radicals, up to 20 mol. %, preferably up to 10 mol. %, of radicals of other aromatic or cycloaliphatic dicarboxylic acids having from 8 to 14 carbon atoms or aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol or 1,4-butanediol radicals, up to 20 mol. %, preferably up to 10 mol. %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxy-phenyl)-propane (DE-A 2 407 674, 2 407 776, 2 715 932).

The polyalkylene terephthalates may be branched by the incorporation of relatively small amounts of tri- or tetrahydric alcohols or tri- or tetra-basic carboxylic acids, for example according to DE-A 1 900 270 and U.S. Pat. No. 3,692 744. Examples of preferred branching agents are trimesic acid, trimellitic acid, trimethylol-ethane and -propane and pentaerythritol.

Particular preference is given to polyalkylene terephthalates which have been prepared solely from terephthalic acid and its reactive derivatives (e.g. its dialkyl esters) and ethylene glycol and/or 1,4-butanediol, and mixtures of such polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. using an Ubbelohde viscometer.

The polyalkylene terephthalates may be prepared by known methods (e.g. Kunststoff-Handbuch, Volume VIII, p. 695 et seq., Carl-Hanser-Verlag, Munich 1973).

Polyoxymethylenes are also suitable as component A).

Component B

Component B comprises a mixture, obtained by co-precipitation, of at least two graft polymers B.1 and B.2. Each of graft polymers B.1 and B.2 is prepared by the polymerization of i) from 5 to 95 wt. %, preferably from 20 to 80 wt. %, particularly preferably from 25 to 60 wt. %, especially from 30 to 50 wt. %, of at least one vinyl monomer with ii) from 95 to 5 wt. %, preferably from 80 to 20 wt. %, particularly preferably from 75 to 40 wt. %, especially from 30 to 50 wt. %, of one or more graft bases having glass transition temperatures <10° C., preferably <0° C., particularly preferably <−20° C., the percents, in all cases being relative to the weight of the graft polymer.

The graft base ii) generally has a mean particle size ($d_{50}$ value) of from 0.05 to 5 µm, preferably from 0.10 to 0.5 µm, particularly preferably from 0.20 to 0.40 µm.

Monomers i) are preferably mixtures of i1) from 50 to 99 parts by weight of vinyl aromatic compounds and/or vinyl aromatic compounds substituted on the ring (such as, for example, styrene, α-methylstyrene, p-methylstyrene, p-chlorostyrene) and/or (meth)acrylic acid ($C_1$-$C_8$)-alkyl esters (such as, for example, methyl methacrylate, ethyl methacrylate) and i2) from 1 to 50 parts by weight of vinyl cyanides (unsaturated nitriles, such as acrylonitrile and methacrylonitrile) and/or (meth)acrylic acid ($C_1$-$C_8$)-alkyl esters (such as, for example, methyl methacrylate, n-butyl acrylate, tert.-butyl acrylate) and/or derivatives (such as anhydrides and imides) of unsaturated carboxylic acids (for example maleic anhydride and N-phenyl maleimide).

Preferred monomers i1) are selected from the group consisting of styrene, α-methylstyrene and methyl methacrylate; preferred monomers i2) are selected from the group consisting of acrylonitrile, maleic anhydride and methyl methacrylate.

Particularly preferred, monomers are i1) styrene and i2) acrylonitrile.

Suitable graft bases ii) for the graft polymers B.1 and B.2 include diene rubbers, EP(D)M rubbers (that is to say those based on ethylene/propylene and optionally diene monomers) as well as acrylate, polyurethane, silicone, chloroprene and ethylene/vinyl acetate rubbers.

Preferred graft bases ii) are diene rubbers. Within the scope of the present invention, diene rubbers are understood to be diene rubbers (e.g. based on butadiene, isoprene, etc.) or mixtures of diene rubbers or copolymers of diene rubbers or mixtures thereof with other copolymerizable monomers (e.g. according to i1) and i2)), preferably butadiene-styrene copolymers containing preferably up to 30 wt. % styrene, with the proviso that the glass transition temperature of component ii) is <10° C., preferably <0° C., particularly preferably <−20° C.

Pure polybutadiene rubber is particularly preferred.

Acrylate rubbers suitable as graft base ii) for graft polymers B.1 and B.2 are preferably polymers of acrylic acid alkyl esters, optionally containing up to 40 wt. %, based on ii), of other polymerizable, ethylenically unsaturated monomers. The preferred polymerizable acrylic acid esters include $C_1$-$C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and mixtures of those monomers.

For crosslinking, monomers having more than one polymerizable double bond can be copolymerized. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as, for example, ethylene glycol dimethacrylate, allyl methacrylate; polyunsaturated heterocyclic compounds, such as, for example, trivinyl cyanurate and triallyl cyanurate; polyfunctional vinyl compounds, such as di- and tri-vinylbenzenes; and also triallyl phosphate and diallyl phthalate.

Preferred crosslinking monomers are allyl methacrylate, ethylene glycol dimethacrylate, diallyl phthalate, and heterocyclic compounds containing at least 3 ethylenically unsaturated groups.

Particularly preferred crosslinking monomers are the cyclic monomers triallyl cyanurate, triallyl isocyanurate, triacryloylhexahydro-s-triazine, triallyl benzenes. The amount of crosslinking monomers is preferably from 0.02 to 5 wt. %, especially from 0.05 to 2 wt. %, based on the graft base ii).

In the case of cyclic crosslinking monomers having at least 3 ethylenically unsaturated groups, it is advantageous to limit the amount to less than 1 wt. % of the graft base ii).

Preferred "other" polymerizable ethylenically unsaturated monomers which may optionally be used, in addition to the acrylic acid esters, in the preparation of the graft base ii) are, for example, acrylonitrile, styrene, α-methylstyrene, acrylamides, vinyl $C_1$-$C_6$-alkyl ethers, methyl methacrylate, butadiene. Preferred acrylate rubbers as the graft base ii) are emulsion polymers having a gel content of at least 60 wt. %.

Further suitable graft bases according to ii) are silicone rubbers having graft-active sites, as are described in DE-OS 3 704 657, DE-OS 3 704 655, DE-OS 3 631 540 and DE-OS 3 631 539.

The gel content of the graft base ii) is determined at 25° C. in a suitable solvent (M. Hoffmann, H. Krömer, R. Kuhn, Polymeranalytik I and II, Georg Thieme-Verlag, Stuttgart 1977).

The mean particle size $d_{50}$ is the diameter above and below which 50 wt. % of the particles lie. It can be determined by means of ultracentrifuge measurement (W. Scholtan, H. Lange, Kolloid-Z. und Z. Polymere 250 (1972), 782-796).

Particularly preferred polymers B.1 and B.2 are, for example, ABS polymers (preferably produced by emulsion polymerization), such as are described, for example, in DE-A 2 035 390 (=U.S. Pat. No. 3,644,574) or in DE-A 2 248 242 (=GB-PS 1 409 275) or in Ullmann, Enzyklopädie der Technischen Chemie, Vol. 19 (1980), p. 280 et seq. The gel content of the graft base ii) is generally at least 30 wt. %, preferably at least 40 wt. % (measured in toluene).

The graft copolymers B.1 and B.2 are prepared by free-radical polymerization in general and preferably by emulsion polymerization.

The graft copolymer B.1 to be used according to the invention is prepared by redox initiation.

Redox initiator systems which are suitable according to the invention generally include an organic oxidising agent and a reducing agent, it being possible for heavy metal ions additionally to be present in the reaction medium; the procedure is preferably carried out without heavy metal ions.

Organic oxidising agents which are suitable according to the invention are, for example and preferably, di-tert.-butyl peroxide, cumene hydroperoxide, dicyclohexyl percarbonate, tert.-butyl hydroperoxide, p-menthane hydroperoxide or mixtures thereof, with cumene hydroperoxide and tert.-butyl hydroperoxide being particularly preferred. $H_2O_2$ may likewise be used.

Reducing agents which may be used according to the invention are preferably water-soluble compounds having a reducing action, preferably selected from the group of the salts of sulfinic acid, salts of sulfurous acid, sodium dithionite, sodium sulfite, sodium hyposulfite, sodium hydrogen sulfite, ascorbic acid and salts thereof, Rongalit®C (sodium formaldehyde sulfoxylate), mono- and di-hydroxyacetone, sugars (e.g. glucose or dextrose). In principle, it is also possible to use, for example, iron(II) salts, such as, for example, iron(II) sulfate, tin(II) salts, such as, for example, tin(II) chloride, titanium(III) salts, such as titanium(III) sulfate; however, no such metal salts are preferably used.

Particularly preferred reducing agents are dextrose, ascorbic acid (salts) or sodium formaldehyde sulfoxylate (Rongalit®C).

The graft copolymer B.2 to be used according to the invention is prepared by persulfate initiation.

Persulfate compounds which are suitable according to the invention are ammonium peroxodisulfate, potassium peroxodisulfate, sodium peroxodisulfate or mixtures thereof.

Preparation of the Co-precipitated Graft Polymers B.1 and B.2

The preparation of the co-precipitated graft polymers to be used according to the invention is carried out by mixing at least one graft polymer B.2 in latex form, prepared using at least one persulfate compound as initiator, with at least one graft polymer B.1 in latex form, prepared using at least one redox system as initiator, mixing the latices homogeneously and working up the resulting graft polymer mixture using known methods.

Examples of suitable methods of working up are, for example, precipitation of the graft polymer mixture by the action of aqueous electrolyte solutions, such as, for example, solutions of salts (e.g. magnesium sulfate, calcium chloride, sodium chloride), solutions of acids (e.g. sulfuric acid, acetic acid) or mixtures thereof, precipitation by the action of cold (freeze coagulation), or obtaining the co-precipitated product directly from the latex by spray drying.

Precipitation of the graft polymer mixture is usually followed by a washing step (preferably using water) and a drying step (e.g. in a fluidised bed drier or a flow drier).

A preferred method of working up after precipitation is mixing of the moist graft polymer mixture with a thermoplastic resin melt in a kneading reactor, as described in EP-A 867 463 (the corresponding U.S. Pat. No. 6,153,692 is incorporated herein by reference). Details relating to that method of working up are also described in EP-A 867 463. The mixtures of graft polymer mixture and thermoplastic resin B.3 (especially styrene/acrylonitrile copolymer) obtained by that method of working up are preferably used for preparing the molding compositions according to the invention.

Suitable thermoplastic resins according to component B.3 are vinyl (co)polymers. They are resinous, thermoplastic and rubber-free. They are polymers of at least one monomer from the group of the vinyl aromatic compounds, vinyl cyanides (unsaturated nitriles), (meth)acrylic acid $(C_1-C_8)$-alkyl esters, unsaturated carboxylic acids and derivatives (such as anhydrides and imides) of unsaturated carboxylic acids. Particularly suitable are (co)polymers of B.3.1 from 50 to 99 parts by weight, preferably from 60 to 80 parts by weight, of vinyl aromatic compounds and/or vinyl aromatic compounds substituted on the ring (such as, for example, styrene, α-methylstyrene, p-methyl-styrene, p-chlorostyrene) and/or (meth)acrylic acid $(C_1-C_8)$-alkyl esters (such as, for example, methyl methacrylate, ethyl methacrylate), and B.3.2 from 1 to 50 parts by weight, preferably from 20 to 40 parts by weight, of vinyl cyanides (unsaturated nitriles), such as acrylonitrile and/or methacrylonitrile, and/or (meth)acrylic acid $(C_1-C_8)$-alkyl esters (such as, for example, methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl maleimide).

The copolymer of styrene and acrylonitrile is particularly preferred.

The graft polymers B.1 and B.2 may be co-precipitated in any desired mixing ratios. The ratio by weight B.1:B.2 is preferably from 95:5 to 5:95, particularly preferably from 90:10 to 25:75 and most particularly preferably from 85:15 to 50:50.

The co-precipitated graft polymer B is particularly preferably in dispersed form in a matrix of vinyl (co)polymer B.3, preferably in a styrene/acrylonitrile copolymer matrix. The ratio by weight B:B.3 is from 90:10 to 10:90, preferably from 80:20 to 30:70 and particularly preferably from 70:30 to 40:60.

It is also possible to mix together the thermoplastic resin component A), the graft polymer component obtained by co-precipitation of B.1) and B.2) and the vinyl (co)polymer component B.3), and optional additives, in a compounding step in conventional compounding devices and then mix the mixture with the other components in the conventional manner and process it further. It is also possible to mix components B and B.3 separately with the remaining components and additives and process the mixture further.

Component C

The compositions may be rendered flame-resistant by the addition of suitable additives. Examples of flameproofing include halogen compounds, for example based on chlorine and bromine, phosphorus-containing compounds and silicon compounds, especially silicone compounds.

Flameproofing agents are used in an amount of preferably from 1 to 18 parts by weight, particularly preferably from 2 to 16 parts by weight.

The compositions preferably contain phosphorus-containing flameproofing agents from the groups of the monomeric and oligomeric phosphoric and phosphonic acid esters, phosphonate amines and phosphazenes, it also being possible to use as flameproofing agents mixtures of a plurality of components selected from one of those groups or from various of those groups. Phosphorus compounds not mentioned specifically here may also be used, alone or in any desired combination with other flameproofing agents.

Preferred monomeric and oligomeric phosphoric and phosphonic acid esters are phosphorus compounds of the general formula (IV)

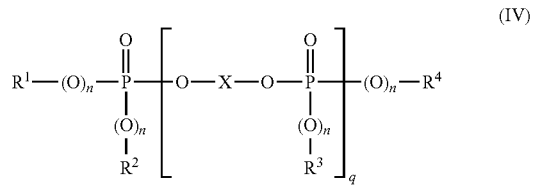
(IV)

wherein
$R^1$, $R^2$, $R^3$ and $R^4$ each independently of the others represents optionally halogenated $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably by $C_1$- to $C_4$-alkyl, and/or by halogen, preferably chlorine, bromine,
n independently one of the others is 0 or 1,
q is 0 to 30, and
X represents a mono- or poly-nuclear aromatic radical having from 6 to 30 carbon atoms, or a linear or branched aliphatic radical having from 2 to 30 carbon atoms, which may be OH-substituted and may contain up to 8 ether bonds.
$R^1$, $R^2$, $R^3$ and $R^4$ each independently of the others preferably represents $C_1$- to $C_4$-alkyl, phenyl, naphthyl or phenyl-$C_1$-$C_4$-alkyl. The aromatic groups $R^1$, $R^2$, $R^3$ and $R^4$ may themselves be substituted by halogen and/or alkyl groups, preferably by chlorine, bromine and/or by $C_1$- to $C_4$-alkyl. Particularly preferred aryl radicals are cresyl, phenyl, xylenyl, propylphenyl or butylphenyl and the corresponding brominated and chlorinated derivatives thereof.
X in formula (IV) preferably represents a mono- or poly-nuclear aromatic radical having from 6 to 30 carbon atoms. It is preferably derived from diphenols of formula (I).
n in formula (IV), independently of the others, is 0 or 1, preferably 1.
q represents values of from 0 to 30, preferably from 0.3 to 20, particularly preferably from 0.5 to 10, especially from 0.5 to 6, most particularly preferably from 0.2 to 2.
X particularly preferably represents a member selected from the group consisting of

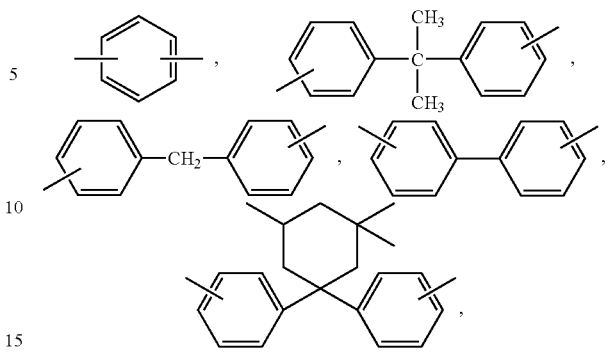

or the chlorinated or brominated derivatives thereof. X is derived especially from resorcinol, hydroquinone, bisphenol A or diphenylphenol. X is derived particularly preferably from bisphenol A.

It is also possible to use mixtures of different phosphates as component C according to the invention.

Phosphorus compounds of formula (IV) are especially tributyl phosphate, triphenyl phosphate, tricresyl phosphate, diphenylcresyl phosphate, diphenyloctyl phosphate, diphenyl-2-ethylcresyl phosphate, tri-(isopropylphenyl)phosphate, resorcinol bridged diphosphate and bisphenol A bridged diphosphate.

The phosphorus compounds according to component C are known (see, for example, EP-A 0 363 608, EP-A 0 640 655) and may be prepared by known methods in an analogous manner (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

The mean q values may be measured by determining the composition of the phosphate mixture (molecular weight distribution) by means of a suitable method (gas chromatography (GC), high pressure liquid chromatography (HPLC), gel permeation chromatography (GPC)) and calculating the mean values for q therefrom.

Phosphonate amines and phosphazenes, as are described in WO 00/00541 and WO 01/18105, may also be used as flameproofing agents.

The flameproofing agents may be used alone or in any desired mixture with one another or in admixture with other flameproofing agents.

Compositions containing flameproofing agents preferably have the following composition:
Component A): from 40 to 99 parts by weight, particularly preferably from 45 to 95 parts by weight, especially from 55 to 85 parts by weight
Component B): from 0.5 to 60 parts by weight, particularly preferably from 1 to 40 parts by weight, especially from 3 to 35 parts by weight
Component C): from 0.5 to 20 parts by weight, particularly preferably from 1 to 18 parts by weight, especially from 2 to 16 parts by weight.

Component D

The flameproofing agents corresponding to component C are often used in combination with so-called antidripping agents, which reduce the tendency of the material to produce burning drips in case of fire. Examples of such agents are fluorinated polyolefins, silicones, as well as aramid fibres.

These may also be used in the compositions according to the invention. Fluorinated polyolefins are preferably used as antidripping agents.

Fluorinated polyolefins are known and are described, for example, in EP-A 0 640 655. They are marketed, for example, by DuPont under the trade mark Teflon® 30N.

The fluorinated polyolefins can be used either in pure form or in the form of a coagulated mixture of emulsions of the fluorinated polyolefins with emulsions of graft polymers (component B.1 and B.2) or with an emulsion of a copolymer, preferably a copolymer based on styrene/acrylonitrile, the fluorinated polyolefin being mixed in the form of an emulsion with an emulsion of the graft polymer or of the copolymer and subsequently being coagulated.

The fluorinated polyolefins may also be used in the form of a precompound with the graft polymer (component B.1 or B.2) or with a copolymer according to B.3, preferably a copolymer based on styrene/acrylonitrile. The fluorinated polyolefins are mixed in the form of a powder with a powder or with granules of the graft polymer or copolymer and are compounded in the melt, generally at temperatures of from 200 to 330° C., in conventional devices such as internal kneaders, extruders or twin-shaft screws.

The fluorinated polyolefins may also be used in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. After acid precipitation and subsequent drying, the polymer is used in the form of a pourable powder.

The coagulates, precompounds or masterbatches usually have solids contents of fluorinated polyolefin of from 5 to 95 wt. %, preferably from 7 to 60 wt. %.

The antidripping agents may be present in the composition according to the invention in an amount of preferably from 0.01 to 3 parts by weight, particularly preferably from 0.05 to 2 parts by weight and most preferably from 0.1 to 0.8 part by weight.

Component E (Further Additives)

The compositions according to the invention may also contain at least one of the conventional additives, such as lubricants and mold-release agents, for example pentaerythritol tetrastearate, nucleating agents, antistatics, stabilizers, fillers and reinforcing materials, as well as colorants and pigments.

All parts by weight in this Application are standardised so that the sum of the parts by weight of components A) to E) in the composition is 100.

The compositions according to the invention are prepared by mixing the respective constituents in a known manner and melt-compounding or melt-extruding the mixture at temperatures of from 200° C. to 300° C. in conventional devices such as internal kneaders, extruders and twin-shaft screws.

The individual constituents may be mixed in a known manner either in succession or simultaneously, either at about 20° C. (room temperature) or at a higher temperature.

The molding compositions according to the invention may be used to produce moldings of any kind. The moldings may be produced by injection molding, extrusion and blow molding methods. A further form of processing is the production of moldings by deep-drawing from previously produced sheets or films, and the process of injecting on the back of films in the known Insert Molding Decoration technique (IMD).

Examples of such moldings are films, profiles, casing parts of any kind, e.g. for domestic appliances such as juice extractors, coffee machines, mixers; for office equipment, such as monitors, printers, copiers; exterior and interior motor vehicle parts; sheets, tubes, conduits for electrical installations, windows, doors and other profiles for the construction sector (interior finishing and external applications) as well as electrical and electronics parts, such as switches, plugs and sockets.

The molding compositions according to the invention may also be used especially in the production of the following moldings, for example:

interior fittings for railway vehicles, ships, aircraft, buses and other motor vehicles, external bodywork parts in the motor vehicle sector, casings for electrical devices containing small transformers, casings for devices for processing and transmitting information, casings and coverings for medical devices, massage devices and casings therefor, toy vehicles for children, flat prefabricated wall panels, casings for security devices, heat-insulated transport containers, devices for keeping or caring for small animals, moldings for sanitary and bathroom fittings, grids for covering ventilation openings, moldings for garden and tool sheds, casings for gardening tools.

The Examples which follow serve to illustrate the invention further.

The invention accordingly relates also to a process for the preparation of the compositions and to their use in the production of moldings, and to the moldings themselves.

EXAMPLES

In the Examples which follow, parts are always parts by weight and % are always wt. %, unless indicated to the contrary.

Components used:

Component A1

Linear polycarbonate based on bisphenol A, having a relative solution viscosity of 1.28, measured in methylene chloride at 25° C. and in a concentration of 0.5 g/100 ml.

Component A2

Linear polycarbonate based on bisphenol A, having a relative solution viscosity of 1.24, measured in methylene chloride at 25° C. and a concentration of 0.5 g/100 ml.

Component B1.1 (Comparison Material)

Graft polymer prepared by free-radical emulsion polymerization (using a redox initiator system consisting of tert.-butyl hydroperoxide and sodium ascorbate) of 40 parts by weight of styrene and acrylonitrile in a ratio by weight of 73:27 in the presence of 60 parts by weight of a particulate, crosslinked polybutadiene rubber latex (mean particle diameter $d_{50}$=345 nm), working up by precipitation under the action of a 1:1 magnesium sulfate/acetic acid mixture, washing with water and drying at 70° C.

Component B2.1 (Comparison Material)

Graft polymer prepared by free-radical emulsion polymerization (using a persulfate initiator system consisting of potassium peroxodisulfate) of 40 parts by weight of styrene and acrylonitrile in a ratio by weight of 73:27 in the presence of 60 parts by weight of a particulate, crosslinked polybutadiene rubber latex (mean particle diameter $d_{50}$=345 nm), working up by precipitation under the action of a 1:1 magnesium sulfate/acetic acid mixture, washing with water and drying at 70° C.

Component B2.2 (Comparison Material)

Graft polymer prepared by free-radical emulsion polymerization (using a persulfate initiator system consisting of potassium peroxodisulfate) of 25 parts by weight of styrene and acrylonitrile in a ratio by weight of 73:27 in the presence of 75 parts by weight of a particulate, crosslinked polybutadiene rubber latex (mean particle diameter $d_{50}$=345 nm), working up by precipitation under the action of a 1:1 magnesium sulfate/acetic acid mixture, washing with water and drying at 70° C.

Co-precipitated Component B1.1/B2.1=75:25 (According to the Invention)

75 parts by weight (based on solids) of the graft polymer B1.1 in latex form and 25 parts by weight (based on solids) of the graft polymer B2.1 in latex form are mixed homogeneously; the graft polymer latex mixture is then precipitated under the action of a 1:1 magnesium sulfate/acetic acid mixture. After washing with water, drying is carried out at 70° C.

Co-precipitated Component B1.1/B2.1=50:50 (According to the Invention)

50 parts by weight (based on solids) of the graft polymer B1.1 in latex form and 50 parts by weight (based on solids) of the graft polymer B2.1 in latex form are mixed homogeneously; the graft polymer latex mixture is then precipitated under the action of a 1:1 magnesium sulfate/acetic acid mixture. After washing with water, drying is carried out at 70° C.

Co-precipitated Component B1.1/B2.2=75:25 (According to the Invention)

75 parts by weight (based on solids) of the graft polymer B1.1 in latex form and 25 parts by weight (based on solids) of the graft polymer B2.2 in latex form are mixed homogeneously; the graft polymer latex mixture is then precipitated under the action of a 1:1 magnesium sulfate/acetic acid mixture. After washing with water, drying is carried out at 70° C.

Component B3

Styrene/acrylonitrile copolymer prepared by free-radical solution polymerization, having a styrene/acrylonitrile ratio by weight of 72:28 and a limiting viscosity of 0.55 dl/g (measured in dimethylformamide at 20° C.).

Mixture of Component B1.1 and Component B3 (B1.1-B3, Comparison Material)

50 parts by weight (based on graft polymer content) of component B1.1, moist with water after precipitation and washing, and 50 parts by weight (based on polymer content B3) of component B3 in the form of a melt are mixed in a kneading reactor according to EP-A 867 463, (corresponding to the incorporated by reference U.S. Pat. No. 6,153,692) Example 1.

Mixture of Co-precipitated Component B1.1/B2.1 and Component B3 (B1:1/B2.1-B3, According to the Invention)

50 parts by weight (based on graft polymer content) of co-precipitated component B1.1/B2.1=75:25, moist with water after precipitation and washing, and 50 parts by weight (based on polymer content B3) of component B3 in the form of a melt are mixed in a kneading reactor according to EP-A 867 463, Example 1.

Component C1

Triphenyl phosphate: Disflamoll®TP, Bayer AG, Leverkusen, Germany.

Component C2

Bisphenol A diphosphate: DVP 506, Great Lakes, UK.

Component D

Coagulated mixture of 50 parts by weight of SAN copolymer and 50 parts by weight of PTFE (Blendex®449, General Electric Plastics).

Component E1

Pentaerythritol tetrastearate

Component E2

Phosphite stabiliser

Preparation and Testing of the Molding Compositions

The components used are mixed with the conventional processing aids in a ZSK 25 twin-shaft extruder. The molded articles are produced on an Arburg 270E injection-molding machine at 260° C.

Determination of the notched impact strength is carried out at room temperature ($a_k^{RT}$) or at −20° C. ($a_k^{-20°\ C.}$) according to ISO 180/1A (unit: kJ/m$^2$).

The thermoplastic flowability MVR (melt volume flow rate) is determined according to ISO 1133 (unit: cm$^3$/10 min).

The behavior in fire is measured according to UL-Subj. 94V on specimens measuring 127×12.7×1.6 mm.

The stress cracking behavior (ESC behavior) is tested on specimens measuring 80×10×4 mm. The test medium used is a mixture of 60 vol. % toluene and 40 vol. % isopropanol. The test specimens are pre-stretched by means of a circular arc template (pre-stretching $\epsilon_x$ in percent) and stored in the test medium at room temperature. The stress cracking behavior is assessed by the crack formation or break in dependence on the pre-stretching in the test medium.

Figure 2:
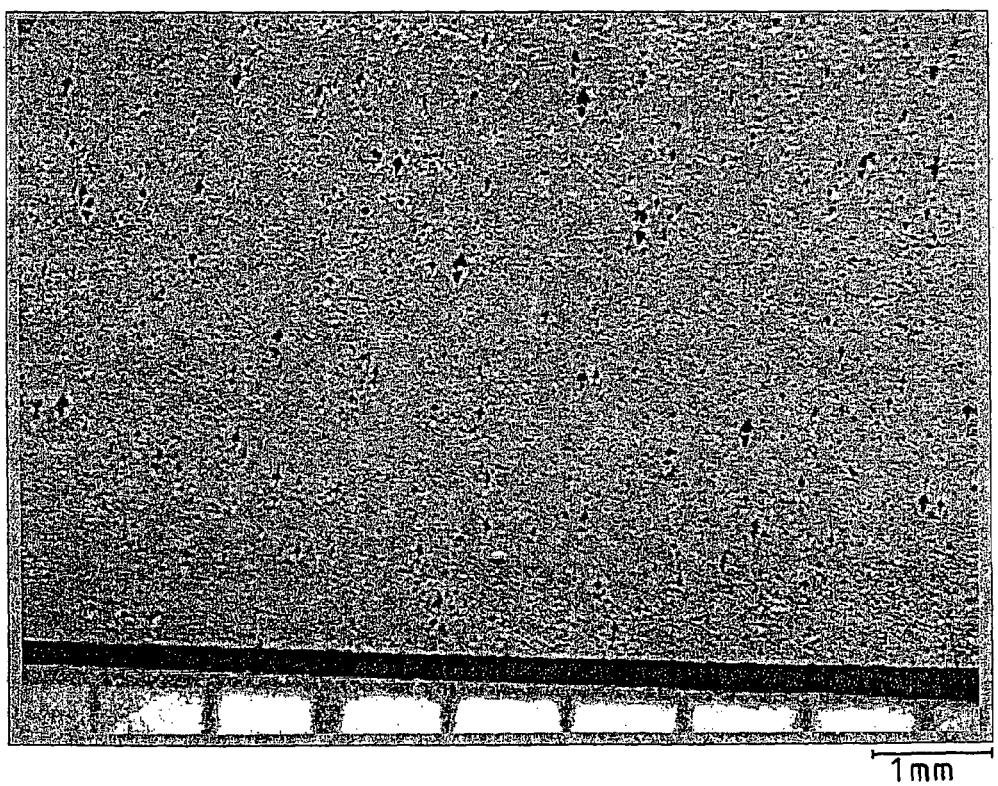
FIG. 2 shows the surface quality characterizing a composition outside the scope of the present invention.

Assessment of the surface is carried out visually on injection-molded sheets measuring 75×50×2 mm, the surface being examined with the aid of a microscope. The surface quality can clearly be seen from FIGS. 1 and 2. FIG. 1 shows a surface which represents the assessment +, FIG. 2 represents the assessment −−.

The following classification is used:

++ Very good surface quality, minimal number of small faults, no large faults at all + Good surface quality, small number of small faults, minimal number of large faults o Moderate, i.e. still acceptable surface quality, small number of small faults and small number of large faults − Poor surface quality, large number of small faults, marked proportion of large faults −− Very poor surface quality, very large number of small and large faults.

Faults within the scope of the present invention are any deviations from a flat and smooth surface, for example depressions (holes) or bumps, rough surface.

TABLE 1

Compositions and properties of molding compositions

| | Components (parts by weight) | | | | | |
|---|---|---|---|---|---|---|
| | 1 | 2 | 3 | 4 (comp.) | 5 (comp.) | 6 (comp.) |
| A1 | 43 | 43 | 43 | 43 | 43 | 43 |
| B1.1 | – | – | – | 24 | – | – |
| B2.1 | – | – | – | – | 24.8 | – |
| B2.2 | – | – | – | – | – | 19.2 |
| Co-precipitated product B1.1/B2.1 = 75:25 | 24.2 | – | – | – | – | – |
| Co-precipitated product B1.1/B2.1 = 50:50 | – | 24.4 | – | – | – | – |
| Co-precipitated product B1.1/B2.2 = 75:25 | – | – | 22.6 | – | – | – |
| B3 | 32.8 | 32.6 | 34.4 | 33 | 32.2 | 37.8 |
| E1 | 0.75 | 0.75 | 0.75 | 0.75 | 0.75 | 0.75 |

TABLE 1-continued

Compositions and properties of molding compositions

| | Components (parts by weight) | | | | | |
|---|---|---|---|---|---|---|
| | 1 | 2 | 3 | 4 (comp.) | 5 (comp.) | 6 (comp.) |
| E2 | 0.12 | 0.12 | 0.12 | 0.12 | 0.12 | 0.12 |
| $a_k^{-20°\,C.}$ (kJ/m$^2$) | 68 | 77 | 69 | 73 | 65 | 16 |
| MVR (cm$^3$/10 min) | 9.9 | 12.6 | 10.8 | 7.8 | 17.6 | 17.2 |
| ESC behavior Break at $\epsilon_x$ (%) | 2.4 | 2.4 | 2.4 | 2.4 | 0.4 | 1.8 |
| Surface | ++ | + | + | −− | ○ | − |

TABLE 2

Compositions and properties of molding compositions

| | Components (parts by weight) | | | | | |
|---|---|---|---|---|---|---|
| | 7 | 8 | 9 | 10 (comp.) | 11 (comp.) | 12 (comp.) |
| A1 | 58 | 58 | 58 | 58 | 58 | 58 |
| B1.1 | – | – | – | 18 | – | – |
| B2.1 | – | – | – | – | 18.6 | – |
| B2.2 | – | – | – | – | – | 14.4 |
| Co-precipitated product B1.1/B2.1 = 75:25 | 18.2 | – | – | – | – | – |
| Co-precipitated product B1.1/B2.1 = 50:50 | – | 18.3 | – | – | – | – |
| Co-precipitated product B1.1/B2.2 = 75:25 | – | – | 16.9 | – | – | – |
| B3 | 23.8 | 23.7 | 25.1 | 24 | 23.4 | 27.6 |
| E1 | 0.75 | 0.75 | 0.75 | 0.75 | 0.75 | 0.75 |
| E2 | 0.12 | 0.12 | 0.12 | 0.12 | 0.12 | 0.12 |
| $a_k^{-20°\,C.}$ (kJ/m$^2$) | 93 | 96 | 87 | 87 | 93 | 53 |
| MVR (cm$^3$/10 min) | 11.9 | 13.4 | 11.8 | 9.8 | 16.6 | 17.1 |
| ESC behavior Break at $\epsilon_x$ (%) | 2.4 | 2.4 | 2.2 | 2.4 | 0.4 | 0.6 |
| Surface | ++ | ++ | + | −− | ○ | − |

TABLE 3

Compositions and properties of molding compositions containing flameproofing agents

| | Components (parts by weight) | | | | |
|---|---|---|---|---|---|
| | 13 | 14 | 15 (comp.) | 16 (comp.) | 17 (comp.) |
| A1 | 52.3 | 52.3 | 52.3 | 52.3 | 52.3 |
| A2 | 16.0 | 16.0 | 16.0 | 16.0 | 16.0 |
| B1.1 | – | – | 9.3 | – | – |
| B2.1 | – | – | – | 9.6 | – |
| B2.2 | – | – | – | – | 7.4 |
| Co-precipitated product B1.1/B2.1 = 75:25 | 9.4 | – | – | – | – |
| Co-precipitated product B1.1/B2.2 = 75:25 | – | 8.8 | – | – | – |
| B3 | 7.5 | 8.1 | 7.6 | 7.3 | 9.5 |
| C1 | 3.4 | 3.4 | 3.4 | 3.4 | 3.4 |
| C2 | 10.1 | 10.1 | 10.1 | 10.1 | 10.1 |
| D | 0.8 | 0.8 | 0.8 | 0.8 | 0.8 |
| E1 | 0.4 | 0.4 | 0.4 | 0.4 | 0.4 |
| E2 | 0.1 | 0.1 | 0.1 | 0.1 | 0.1 |
| $a_k^{RT}$ (kJ/m$^2$) | 44 | 41 | 47 | 12 | 11 |
| MVR (cm$^3$/10 min) | 22 | 22 | 21 | 25 | 25 |
| ESC behavior: $\epsilon_x$ (%) | 2.0 | 2.0 | 2.0 | 2.0 | 1.8 |
| UL 94 V, 1.5 min | V-0 | n.d. | V-0 | V-0 | n.d. |

TABLE 3-continued

Compositions and properties of molding compositions containing flameproofing agents

| | Components (parts by weight) | | | | |
|---|---|---|---|---|---|
| | 13 | 14 | 15 (comp.) | 16 (comp.) | 17 (comp.) |
| After-burning time (s) | 4 | n.d. | 5 | 3 | n.d. |
| Surface | ++ | ++ | ○ | ○ | ○ | n.d. = not determined

TABLE 4

Compositions and properties of molding compositions

| Components (parts by weight) | 18 | 19 (comp.) |
|---|---|---|
| A1 | 54 | 54 |
| A2 | 4 | 4 |
| B1.1/B2.1-B3 | 36 | – |
| B1.1-B3 | – | 36 |
| B3 | 6 | 6 |
| E1 | 0.75 | 0.75 |
| E2 | 0.12 | 0.12 |
| Surface | + see FIG. 1 | −− see FIG. 2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising:
   (A) at least one polymeric resin selected from the group consisting of polycarbonate, polyester carbonate, polyamide, polyalkylene terephthalate and polyoxymethylene; and
   (B) a co-precipitated mixture of,
      (i) a graft polymer B.1 in latex form that is prepared by means of graft copolymerization using a redox initiation system consisting of,
         an oxidizing agent selecting from the group consisting of di-tert.-butyl peroxide, cumene hydroperoxide, dicyclohexyl percarbonate, tert.-butyl hydroperoxide, p-menthane hydroperoxide, H$_2$O$_2$ and combinations thereof, and
         a reducing agent selected from the group consisting of salts of sulfinic acid, salts of sulfurous acid, ascorbic acid, and salts of ascorbic acid, sodium formaldehyde sulfoxylate, mono-hydroxyacetone, di-hydroxyacetone, sugars, iron(II) salts, tin(II) salts, titanium(III) salts and combinations thereof, and
      (ii) a graft copolymer B.2 in latex form that is prepared by means of graft copolymerization using an initiation system consisting of persulfate compounds
   wherein each of B.1 and B.2 is a product of polymerizations of i) from 5 to 95 wt. % of at least one vinyl monomer with ii) from 95 to 5 wt. % of one or more crosslinked graft bases having glass transition temperatures lower than 10° C.

2. The composition according to claim 1 comprising 10 to 99.5 parts by weight of component A) and 0.5 to 90 parts by weight of component B).

3. The composition according to claim 2 further comprising at least one flameproofing agent.

4. The composition according to claim 1 further comprising at least one fluorinated polyolefin.

5. The composition according to claim 1 further comprising at least one vinyl (co)polymer, B.3.

6. The composition according to claim 3 wherein the flameproofing agent is selected from the group consisting of monomeric and oligomeric phosphorus compounds.

7. The composition according to claim 6 wherein the phosphorus compounds conform to formula

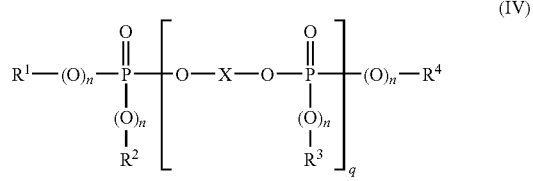

(IV)

wherein
$R^1$, $R^2$, $R^3$ and $R^4$ independently one of the others represents a member selected from the group consisting of $C_1$- to $C_8$-alkyl, $C_5$- to $C_6$-cycloalkyl, $C_6$- to $C_{20}$-aryl and $C_7$- to $C_{12}$-aralkyl, n independently one of the others is 0 or 1, q is 0 to 30, and X is a mono- or poly-nuclear aromatic radical having 6 to 30 carbon atoms, or a linear or branched aliphatic radical having from 2 to 30 carbon atoms.

8. The composition according to claim 5 wherein the vinyl (co)polymer is the product of polymerization of at least one monomer selected from the group consisting of vinyl aromatic compounds, vinyl cyanides, (meth)acrylic acid ($C_1$-$C_8$)-alkyl esters, unsaturated carboxylic acids and derivatives of unsaturated carboxylic acids.

9. The composition according to claim 8 wherein the vinyl (co)polymer is a product of polymerization of from 50 to 99 parts by weight of at least one monomer selected from the group consisting of vinyl aromatic compounds and (meth)acrylic acid ($C_1$-$C_8$)-alkyl esters and 1 to 50 parts by weight of at least one monomer selected from the group consisting of vinyl cyanides and (meth)acrylic acid ($C_1$-$C_8$)-alkyl esters.

10. The composition according to claim 1 wherein the polymeric resin is selected from the group consisting of polycarbonate and polyamide.

11. The composition according to claim 1, wherein i) is a mixture of
   i1) from 50 to 99 parts by weight of at least one monomer selected from a first group consisting of vinyl aromatic compounds, vinyl aromatic compounds substituted on the ring, and (meth)acrylic acid ($C_1$-$C_8$)-alkyl esters, and
   i2) from 1 to 50 parts by weight of at least one monomer selected from a second group consisting of vinyl cyanides, (meth)acrylic acid (($C_1$-$C_8$)-alkyl esters and derivatives of unsaturated carboxylic acids.

12. The composition according to claim 11, wherein said first group consists of styrene, α-methylstyrene and methyl methacrylate, and said second group consists of acrylonitrile, maleic anhydride and methyl methacrylate.

13. The composition according to claim 1, wherein the graft base is selected from the group consisting of diene rubbers, EP(D)M rubbers and acrylate rubbers.

14. The composition according to claim 13, wherein the graft base is selected from the group consisting of polybutadiene and butadiene/styrene copolymer.

15. The composition according to claim 1, wherein the ratio by weight of graft polymer B.1:B.2 is 95:5 to 5:95.

16. The composition according to claim 15, wherein the ratio is 90:10 to 25:75.

17. The composition according to claim 16, wherein the ratio is 85:15 to 50:50.

18. The composition according to claim 5 wherein B and B.3 relate by weight as 90:10 to 10:90.

19. The composition according to claim 18 wherein the ratio by weight of B:B.3 is 80:20 to 30:70.

20. The composition according to claim 3 wherein flame proofing agent is present in an amount of 0 to 20 parts by weight.

21. The compositions according to claim 1 comprising 20 to 98.5 parts by weight of A) and 1.5 to 80 parts by weight of B).

22. The composition according to claim 21 containing 30 to 98 parts by weight of A) and 2 to 70 parts by weight of B).

23. The compositions according to claim 1 further comprising at least one polymer additive selected from the group consisting of lubricants, mold-release agents, nucleating agents, antistatics, stabilizers, fillers, reinforcing materials, colorants and pigments.

24. A molded article comprising the composition of claim 1.

* * * * *